United States Patent [19]

Chang

[11] Patent Number: 4,842,198
[45] Date of Patent: Jun. 27, 1989

[54] DEVICE FOR DAMAGE PROTECTION AGAINST LOCAL FLOODING CAUSED BY SPRINKLER FAILURE

[76] Inventor: Shih-Chih Chang, 2239 Davison Ave., Richland, Wash. 99352

[21] Appl. No.: 112,555

[22] Filed: Oct. 26, 1987

[51] Int. Cl.$^4$ .......................... F16K 17/04; B05B 1/30
[52] U.S. Cl. ............................ 239/200; 239/533.15; 239/570; 137/514.3
[58] Field of Search .............. 239/11, 63, 67, 68, 239/99, 200, 207, 266, 276, 533.15, 551, 570, 571; 137/514.3, 540

[56] References Cited

U.S. PATENT DOCUMENTS

| | | | |
|---|---|---|---|
| 2,941,629 | 6/1960 | Rohacs | 137/514.3 |
| 3,735,777 | 5/1973 | Katzer et al. | 137/540 |
| 3,811,470 | 5/1974 | Schaefer | 137/540 |
| 4,131,235 | 12/1978 | Lieding | 239/533.15 |

*Primary Examiner*—Andres Kashnikow
*Assistant Examiner*—Karen B. Merritt

[57] ABSTRACT

Irrigation systems which use sprinklers can cause local flooding in the event of either a sprinkler head failure or a broken riser. The result is localized crop damage, irrigation water wastage, land erosion, and deprivation of water for the remainder of the circuit. The disclosed invention provides a method of and, a device for, protecting the irrigation land from the above mentioned potential damage. The disclosed invention comprises an automatic flow shut off device situated between the distribution joint and the individual sprinkler head. The flow shut off device detects and responds to the excess flow caused by the damaged sprinkler and subsequently isolates the water flow to the affected sprinkler. In so doing, the device allows the remainder of the irrigation circuit to operate uninterrupted, temporarily without the service of the damaged sprinkler. This invention not only protects the irrigated land from potential flood damage but also serves water and maintenance costs and reduces irrigation down time.

2 Claims, 3 Drawing Sheets

DEVICE FOR DAMAGE PROTECTION AGAINST LOCAL FLOODING CAUSED BY SPRINKLER FAILURE

BACKGROUND OF THE INVENTION

For a large portion of the United States, and particularly in the Western States, irrigation is needed for growing agricultural products as well as maintaining lawn, plants, and other landscaping around dwellings and in public areas. In 1986 there were nearly 60 million acres of agricultural land under irrigation in the United States. Of this total, nearly 40% were irrigated by sprinkler systems.

A relatively common problem in irrigation sprinkler systems is local flooding caused by missing sprinkler heads or broken risers. The result is land erosion, loss of crops, waste of water, and insufficient water to the remainder of the circuit. Currently, there is no reliable way to prevent this problem. Monitoring for failures is a major concern in operating a sprinkler irrigation system. The irrigation operators must constantly watch for missing nozzles or broken risers. Once the problem is detected, the operator must shut down the system, usually at a location removed from the break, and return to the break location to repair the nozzle or riser before the irrigation system can be re-started again. This not only demands extra labor but also causes increased operational costs and system down-time. In addition there are frequently breaks or missing nozzles that are overlooked by the operator and, left unchecked, result in serious consequences.

In most sprinkler systems, water is carried throughout the irrigation site by a water supply pipe and thence to individual sprinkler branches distributed along the pipe. In a typical system each individual sprinkler branch consists of a riser and a sprinkler head. The riser, which is a short length of vertical pipe, is connected to the supply pipe by a distribution joint, a tee or a elbow, and the sprinkler head is connected to the outlet end of the riser. The purpose of the riser is to elevate the sprinkler head to the desired level above the ground.

The sprinkler head consists of one or more small nozzles which are designed both to allow the water to exit as a stream of droplets and to limit the water flow. In the event the sprinkler head is missing or the riser is broken, the water will flow out of the affected branch at an elevated rate as a single column of water, which has the potential to cause flooding and damage the soil and the drops. In addition, the elevated flow through the damaged sprinkler branch will exhaust the overall water supply and thereby reduce the flow to the remainder sprinklers of the system. In many applications, the supply pipes, the distribution joints, and a part of the risers are installed underground, where they are reasonably well protected. However, in almost all cases, the sprinkler heads are positioned near or above the ground level and are consequently vulnerable to physical damage. The sprinkler heads are also subject to failure from vibration due to hydraulic force and mechanical fatigue.

When the sprinkler is operating normally, that is with the sprinkler head and the riser intact, the discharge flow from the sprinkler is limited by the small flow path of the sprinkler nozzle. When the sprinkler head is missing or the riser is broken, the flow restriction of the nozzle is removed. As a consequence, the outlet flow from the broken branch will drastically increase due to the reduction of flow resistance. The disclosed invention describes a method and a device that utilizes this characteristic of the drastically increased water flow to control the damaged sprinkler flow and subsequently protecting the irrigation area against the potential flooding damage.

OBJECTIVES OF THE INVENTION

The objective of the present invention is to provide a method and a device for protecting water damage caused by missing sprinkler heads or broken risers in a water sprinkler system.

More specifically the disclosed invention provides a reliable method and device which will shut off the flow to the affected sprinkler branch in the event of a failure. This will allow the remaining sprinkler system to operate without interruption, however, temporarily without the service of the damaged unit.

The disclosed device is situated between the sprinkler head and the supply feed pipe and responds to excess flow by isolating the sprinkler head from the supply pipe. The device will not affect normal operation, yet can respond to a damaged sprinkler and shut off the water automatically.

SUMMARY OF THE INVENTION

The disclosed invention involves an automatic flow shut-off device which is designed to be installed for an individual sprinkler branch between the sprinkler head and the supply pipe. Said device consists of a casing and a flow shut-off mechanism which actuates upon a pre-set high flow threshold. This flow threshold is higher than that of the normal operation with the sprinkler head but lower than the abnormal elevated flow associated with a broken sprinkler branch. Thus, with the sprinkler head and riser intact, the flow is below the threshold, the shut-off mechanism is open allowing the water flow through. When the sprinkler head is missing or the riser is broken, the discharge flow from the broken sprinkler branch will exceed the threshold flow rate. This abnormal elevated flow will actuate the the shut-off mechanism automatically and consequently stop the discharge flow from the broken branch.

I discovered that another crucial aspect in the design of the shut-off device for this particular application is related to the phenomenon of transient flow surges of the normal irrigation system during start-up. These surges, which quite often exceed the normal flow rate, are caused by the trapped air which fills a portion of the irrigation piping. The air, which replaces the water normally present during operation, produced a decreased system resistant and high flow surges until the air is discharged. These high flow surges are a part of normal start-up and there is no need to isolate a sprinkler which exhibits these transient surges. Therefore the automatic shut-off device must differentiate the temporary excess flow surges of normal start-up from the elevated flow associated with the loss of a sprinkler head in order to allow the system to start up without interruptions.

These start-up surges, of which there may be several, are each of very short duration. I found that a damping mechanism incorporated in the shut-off device can delay the shut-off action and allows the temporary flow surges to pass unimpeded and, hence, the system to start up normally. I also found that this damping mechanism is also beneficial in slowing down the flow transient which occurs when the flow is isolated by the device.

By so doing the damping mechanism mitigates the water hammer effect associated with the rapid shut-off.

The working principle of the present invention utilizes the flow variation between the normal irrigation flow and the abnormally high flow which corresponds to a damaged sprinkler branch. The abnormal elevated flow is controlled by a automatic shut-off device, in accordance with the present invention. The hydrodynamic drag force of the water flow acts on a movable plug means situated in the flow path, which in turn acts against a mechanical spring. The spring is so selected that it can withstand the pressure applied by normal sprinkler flow but not that which results from flows greater than the threshold flow. The damping mechanism is provided by a dash-pot means which is essential for handling the temporary surges during a irrigation system start-up.

The disclosed invention is a low cost solution which will protect the sprinkler irrigation system from accidental flooding due to loss of sprinkler nozzles or broken risers. This protection prevents the potential landscape damage, water erosion, loss of crops, and waste of water. The disclosed invention would also reduce irrigation system down time, simplify operation procedure, save labor and reduce operation costs. In the event a sprinkler head is missing, the device will automatically shut off the flow to the affected sprinkler. This will allow the sprinkler system to continue to operate with the unaffected sprinklers, while flow ceases for the missing ones. When the missing sprinkler head is discovered and repaired, the sprinkler system will return to its normal operation. I believe that the disclosed invention has the potential to become a standard component for most sprinkler systems. It can thus effect millions of acres of agricultural land across the country and most domestic uses of water sprinklers.

DETAILED DESCRIPTION OF THE PREFERRED EMBODIMENTS

Figure 1:
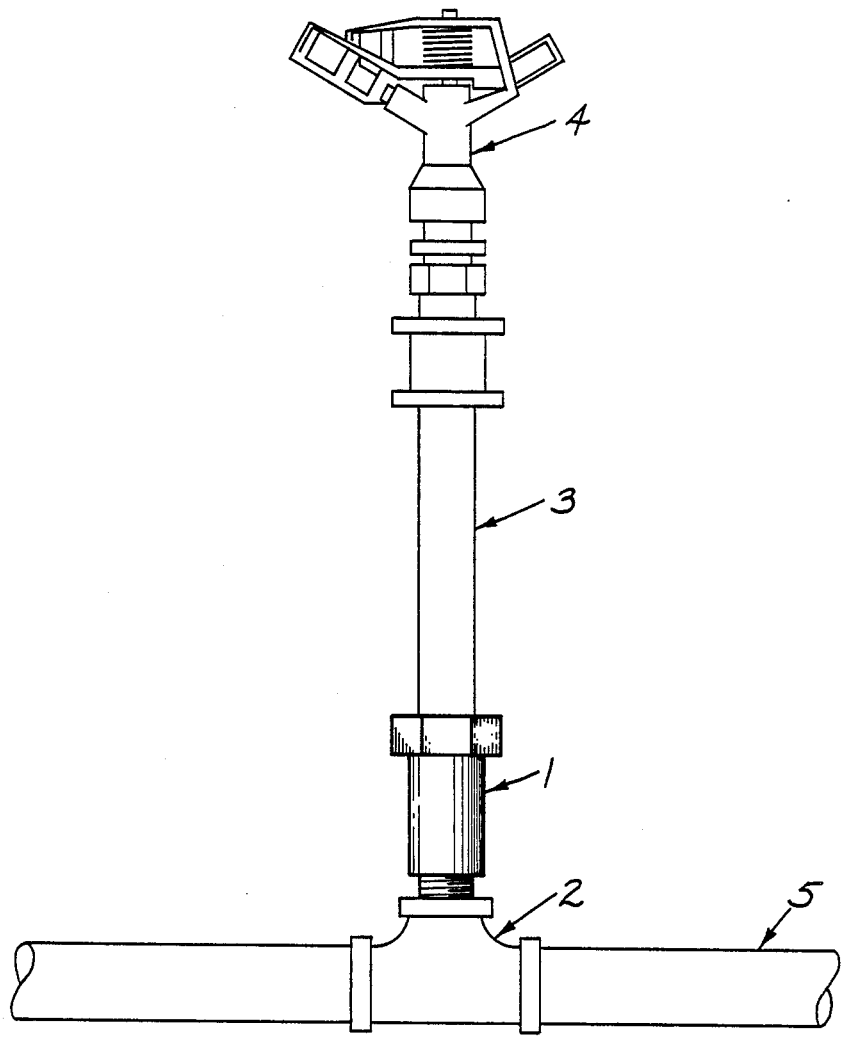
FIG. 1 is a schematic view of a disclosed water damage protection system for sprinkler irrigation.

Referring to FIG. 1, the automatic flow shut off device 1 is installed between a distribution tee 2 and the riser 3. The sprinkler head 4 is connected to the outlet port of the riser. The water is supplied through the supply pipe 5 to the distribution tee. The flow shut off device will respond to a flow that is higher than the pre-set flow threshold and subsequently shut off the flow through the device. This flow threshold must be so set that it is higher than the normal flow when the riser and sprinkler head ate in tact but lower than the abnormal elevated flow due to a missing sprinkler head of a broken riser. Then, at normal operation the water will pass the shut off device freely. When the sprinkler is missing or when the riser is damaged, the flow rate through the affected unit tends to increase over the flow threshold of the flow shut off device. This will consequently trigger the device to shut off the flow. Thereby, the irrigated area is protected against the potentially damaging event of local flooding.

Figure 2:
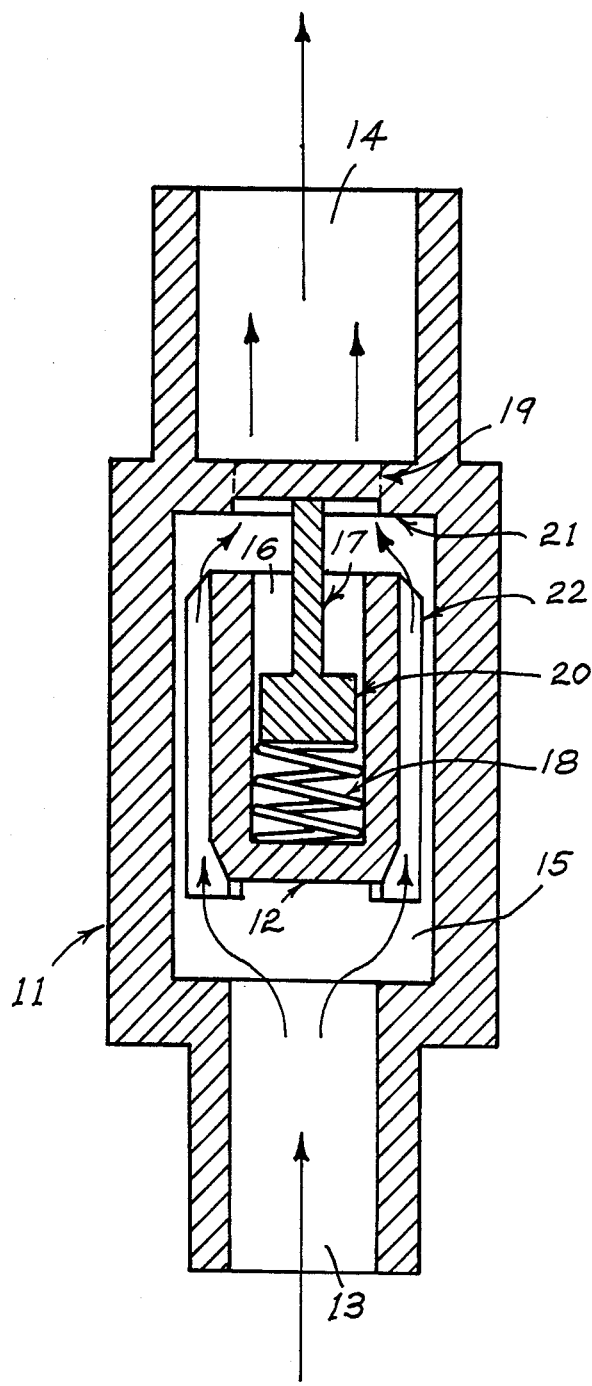
FIG. 2 is an enlarged cross section view of a preferred embodiment of the flow shut-off device at open position during normal operation when the sprinkler is intact.

A preferred embodiment of the shut-off device is shown in FIG. 2 which consists of a casing body 11 and a plug assembly 12. The casing houses the plug assembly and conducting the water flowing therethrough. The plug assembly provides the shut-off and damping functions. The casing has an inlet port 13 and an outlet port 14, and a flow chamber 15. The plug assembly is movable in the cavity along the flow direction. The bore of flow cavity within the casing body is substantially greater than the plug diameter so that the water can flow through the gap between the plug and the inner walls of the chamber when the plug is at the open position. The plug assembly consists of a plug body with a center cylindrical cavity 16, a piston 17 which can slide along the central cylindrical cavity of the plug body, and a mechanical spring 18 positioned inside of the cylindrical cavity of the plug such that one end of the spring sits on the bottom of the cylindrical cavity and the other end rests against the inner side of the piston. The piston has a piston rod connected to outer side of the piston. There is a piston rod stopper 19 that limits the motion of the piston rod towards the outlet direction. Thus, motion of the plug body towards the outlet port must cause a sliding motion of the piston relative to the plug and therefore cause a compression of the spring and a reduction of the volume of the space formed by the cavity walls and the piston end surface.

Under normal flow conditions, when watering with the sprinkler head and riser intact, the water flows from the inlet port, around the plug, and exits through the outlet port. A hydrodynamic drag upon the plug is caused by this flow. This drag force tends to drive the plug toward the outlet port. This force is approximately proportional to the second power of the flow rate. The hydrodynamic drag force is transmitted to and acts upon the mechanical spring such that the flow tends to compress the spring. The spring is so designed that it can support the drag force resulting from normal flow of water but not substantially greater than that. In the case of a missing sprinkler nozzle, or when the riser is broken, the flow tends to increase substantially, resulting in a proportionately even greater increase in the hydraulic drag due to the non-linear relationship between the flow and the drag. This increased drag will overcome the spring force and push the plug towards the outlet port and eventually causes the valve to close. Thus, the flow shut-off device will not affect operation with normal sprinklers, but it will shut off the water flow when the sprinkler head is missing or when the riser is broken.

The central cavity of the plug and the piston is designed to act as a damping mechanism. There is a small gap between the piston and the bore of cylindrical cavity designed into the mechanism so that water in the cavity can be squeezed out of the cavity when the piston moves inwards. A damping force is generated by the ejection of the water through the small gap 20 that slows down the shut-off action of the plug. When plug body moves to the outlet end, the shoulder of the plug sits on the valve seat 21 of the casing and shuts off the flow. A number of radially outward vanes 22 attached to the outer wall of the plug which guide the plug to move co-axially with the flow chamber 15.

Figure 3:
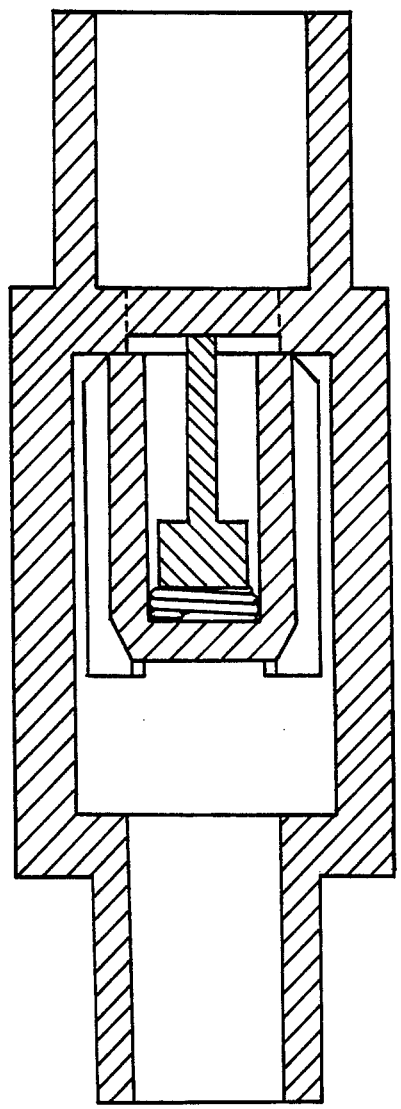
FIG. 3 is an enlarged cross section view of a preferred embodiment of the flow shut-off device at the shut-off position after it has been activated by a flow exceeding the threshold flow due to a missing sprinkler head or a broken riser.

FIG. 3 shows the flow shut-off device at the closed postion. In this position the plug 12 has moved by the hydraulic force to the most forward position such that the front shoulder of the plug sits on the valve seat 21. Then, the flow path through the device is completely blocked by the plug and the flow of this branch is stopped.

I claim:

1. A valve for isolating a sustained abnormal elevated fluid flow and allowing normal flow and temporary flow surges to pass therethrough comprising a valve housing having an flow passage therethrough, an inlet and an outlet ports for connection to upstream and downstream conduits respectively, and a valve seat near said outlet port;

a closure means housed in said housing and being moveable along the longitudinal direction of said flow passage, the cross-section of said closure means being substantially smaller than the cross-section of said flow passage such that a flow gap is formed between the inner walls of said housing and the outer walls of said closure means so that said fluid can flow freely through said gap;

a spring means exerting a mechanical force on said closure means against the motion of said closure means towards said valve seat, said mechanical force being so predetermined such that it can withstand the hydraulic force of said normal flow and being overcome by the hydraulic force of said sustained abnormal elevated fluid flow to cause a closure;

a dashpot means connected to said closure means for producing damping force upon a closure motion of said closure means, said damping force being so predetermined that it can prolong said closure motion to a sufficient time period to prevent closures responding to aaid temporary flow surges; said dashpot means being formed by a piston means housed in a circular cylindrical cavity of said closure means such that a motion of said closure means towards said valve seat generating a sliding motion of said piston in said cylindrical cavity, a small flow path being provided for communicating the interior and exterior of said spaced; said sliding motion of said piston pressurizing the fluid in said cylindrical cavity and forcing said fluid in to exit through said small flow path; the resistance force of the flow through said small flow path transmitting to said plug and consequently providing damping action on said plug.

2. A valve as in claim 1 said small flow path being the gap of a predetermined dimension between said piston and the inner walls of said cylindrical cavity.

* * * * *